US008787868B2

(12) United States Patent
Leblanc et al.

(10) Patent No.: US 8,787,868 B2
(45) Date of Patent: Jul. 22, 2014

(54) ALARM NOTIFICATION SYSTEM AND METHOD

(76) Inventors: Daniel Leblanc, Hadera (IL); Bernard Leblanc, Passy Grigny (FR)

( * ) Notice: Subject to any disclaimer, the term of this patent is extended or adjusted under 35 U.S.C. 154(b) by 187 days.

(21) Appl. No.: 13/382,354

(22) PCT Filed: Aug. 17, 2009

(86) PCT No.: PCT/IB2009/053617
§ 371 (c)(1),
(2), (4) Date: Jan. 5, 2012

(87) PCT Pub. No.: WO2011/021067
PCT Pub. Date: Feb. 24, 2011

(65) Prior Publication Data
US 2012/0100828 A1 Apr. 26, 2012

(51) Int. Cl.
 H04M 19/04 (2006.01)
 G08B 13/14 (2006.01)
 G08B 25/08 (2006.01)
(52) U.S. Cl.
 CPC ........... *G08B 13/1409* (2013.01); *H04M 19/04* (2013.01); *G08B 25/08* (2013.01)
 USPC ......... 455/404.1; 455/466; 455/572; 455/567
(58) Field of Classification Search
 USPC ............................ 455/404.1–404.2, 572–574,
     455/343.1–343.6, 127.1–127.5, 128, 129,
     455/567, 458, 466, 550.1, 575.1, 90.3;
                                    340/539.11
 See application file for complete search history.

(56) References Cited

U.S. PATENT DOCUMENTS

| 4,155,042 | A | * | 5/1979 | Permut et al. ................... 340/7.5 |
| 5,754,962 | A | * | 5/1998 | Griffin ........................ 455/569.2 |
| 6,166,627 | A | * | 12/2000 | Reeley .................... 340/426.25 |
| 6,337,971 | B1 | * | 1/2002 | Abts .............................. 340/7.2 |
| 7,492,251 | B1 | * | 2/2009 | Katz ......................... 340/539.22 |
| 7,751,796 | B2 | * | 7/2010 | Koie .......................... 455/404.1 |
| 8,452,259 | B2 | * | 5/2013 | Ellis et al. ..................... 455/410 |
| 8,552,856 | B2 | * | 10/2013 | McRae ..................... 340/539.11 |
| 2003/0050038 | A1 | * | 3/2003 | Haave et al. .................. 455/404 |
| 2010/0003950 | A1 | * | 1/2010 | Ray et al. .................... 455/404.1 |
| 2012/0202428 | A1 | * | 8/2012 | Mirbaha et al. .............. 455/41.2 |
| 2012/0249323 | A1 | * | 10/2012 | McRae ..................... 340/539.11 |
| 2013/0012123 | A1 | * | 1/2013 | DeLuca ........................ 455/39 |

FOREIGN PATENT DOCUMENTS

| GB | 2 320 397 | 6/1998 |
| GB | 2 386 297 | 9/2003 |
| JP | 09 023186 | 1/1997 |
| WO | 01/91435 | 11/2001 |
| WO | WO 0191435 A1 * | 11/2001 |
| WO | 2009/060204 | 5/2009 |

OTHER PUBLICATIONS

Written Opinion of the International Searching Authority for PCT/IB2009/053617.

* cited by examiner

*Primary Examiner* — Sharad Rampuria

(57) ABSTRACT

Apparatus for alert notification, the apparatus comprising: a power mode detector, configured to detect a predefined change in a power mode of a mobile phone, and an alert notifier, associated with the power mode detector and configured to notify a predefined user about an alert condition the detected predefined change in the power mode is indicative of.

21 Claims, 8 Drawing Sheets

ALARM NOTIFICATION SYSTEM AND METHOD

FIELD AND BACKGROUND OF THE INVENTION

The present invention relates to alarm systems and, more particularly, but not exclusively to an alarm notification system utilizing a cellular phone.

Home, business and car alarms have become commonplace.

For example, the very attribute that makes automobiles and similar transportation systems so useful, also makes such transportation systems popular targets for thieves. Within a few short minutes of breaking into an automobile, a thief can take the vehicle miles away in any direction, delivering the vehicle to any point where it can be sold, cut into parts for resale, or used in the commission of a crime.

A rapid increase in the rate of automobile theft created a demand for improved methods of protecting vehicles. Consequently, a vast array of products has offered a wide range of options in responding to a variety of stimuli. Typical events detected by security unit sensors include penetration of the vehicle's physical perimeter, breaking of glass, attempts to activate the engine of the vehicle, the presence of persons within a set distance from the vehicle, and the application of physical force to the vehicle's exterior.

Conventional Alarm systems use sensors range from microphones to infra-red proximity and motion detectors, as well as conventional switches that can detect the opening of a door. Responses range from disabling the engine of the vehicle to a simulated voice advising persons to step away from the vehicle. The most common feature used to alert the owner of an automobile to a potential problem is the audible siren, sometimes able to be heard by persons standing several hundred yards away from the vehicle.

Reference is now made to FIG. 1, which is a block diagram schematically illustrating an alarm system, according to prior art.

The conventional alarm system of FIG. 1 includes a power source 101, say a car's battery, and a central alarm unit 102 which is electrically powered by the power source 101. The conventional system of FIG. 1 further includes an alarm siren 103 (say a buzzer or a speaker), as known in the art.

The conventional alarm system of FIG. 1 further includes sensors 108, for detecting an intrusion attempt, say an attempt to break into a car.

The sensors may include, but are not limited to: motion sensors, passive infrared detectors, magnetic reed switches, glass break detectors, seismic sensors, smoke detectors, fire sensors, hold up burglar system sensors, etc., as known in the art.

When the attempt to break into the car is detected using the sensors 108, the central alarm unit 102 electrically connects the alarm siren 103 to the power source 101, and the alarm siren 103 goes off.

Initially, the activation of an alert siren on an automobile attracted tremendous attention to the vehicle and any person standing near the vehicle. It briefly appeared that siren alarm technology would successfully deter the theft of vehicles equipped with security units, but problems developed.

Users, intent on simply moving the car a short distance, forget to disable the security unit before activating the ignition and soon discovered that the ignition was disabled or an audible alarm was triggered. Security systems designed to respond to the application of physical force to a vehicle responded to the low-frequency sound emission from jet aircraft, large-block automobile engines, or planned, innocuous explosions in the vicinity of the vehicle. Sensors designed to detect the sound of broken glass responded instead to the sound of music played loudly in nearby vehicles.

As vehicles carrying security units proliferated, the sound of needlessly activated alarms began to annoy the population at large. Consequently, people grew intolerant of the constant whine of audible alarms attached to security units.

The problem of inappropriately activated alarms runs deeper than mere annoyance. As the sound of audible alarms grew ubiquitous, people became so desensitized to the sound as to be willing to ignore it. Like the boy who cried wolf, no one took seriously the whining of an alarm in a parking lot, and thieves soon learned that, even if an alarm were tripped, persons within earshot would assume a false alarm and would not bother to investigate.

Alarms soon lost most of their usefulness as devices that would attract the attention of nearby persons. Worse still, people began frequently disabling their security units in order to prevent the disturbance of their neighbors. People with loud interior speakers attached to their alarms began to disable them to prevent their own annoyance. Any hope for the use of security units as an effective deterrent to the theft of automobiles was lost.

The electronics industry soon responded with more configurable security units, but the process of configuration proved too complicated for the average user, and was frequently forgotten, and involved more guesswork than systematic assessment of the risks from which a automobile required protection at any given location.

SUMMARY OF THE INVENTION

According to one aspect of the present invention, there is provided an apparatus for alert notification, the apparatus comprising: a power mode detector, configured to detect a predefined change in a power mode of a mobile phone; and an alert notifier, associated with the power mode detector and configured to notify a predefined user about an alert condition the detected predefined change in the power mode is indicative of.

According to a second aspect of the present invention, there is provided a computer readable medium storing computer executable instructions for performing the steps of: a) detecting a predefined change in a power mode of a mobile phone; and b) notifying a predefined user about an alert condition the detected predefined change in the power mode is indicative of.

According to a third aspect of the present invention, there is provided a kit for alert notification, the kit comprising a computer readable medium storing computer executable instructions for performing the steps of: detecting a predefined change in a power mode of a mobile phone; and notifying a predefined user about an alert condition the detected predefined change in the power mode is indicative of.

According to a fourth aspect of the present invention, there is provided a kit for alert notification, the kit comprising: a power mode detector, configured to detect a predefined change in a power mode of a mobile phone; and an alert notifier, associated with the power mode detector and configured to notify a predefined user about an alert condition the detected predefined change in the power mode is indicative of.

According to a fifth aspect of the present invention, there is provided a method for alert notification, the method comprising the steps of: a) detecting a predefined change in a power mode of a mobile phone; and b) notifying a predefined user about an alert condition the detected predefined change in the power mode is indicative of.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
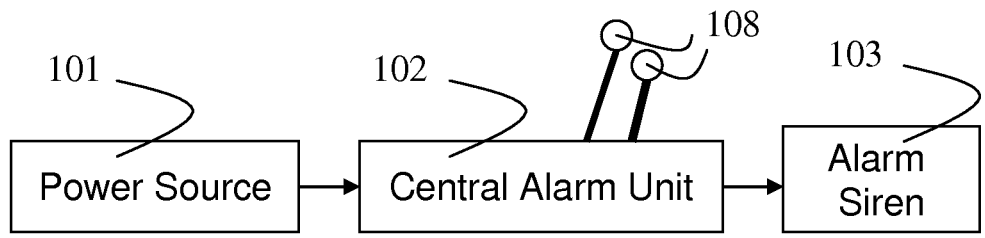
FIG. 1 is a block diagram schematically illustrating an alarm system, according to prior art.

The present embodiments comprise an apparatus, kit, computer readable media and method for alert notification.

According to exemplary embodiments, a mobile phone is installed with an apparatus. Optionally, the apparatus includes one or more modules. The modules are configured to detect a change in the mobile phone's power mode, and upon the detection of the change, to notify a user. For example, the modules may be configured to detect when the mobile phone starts charging, when the mobile phone stops charging, when the mobile phone starts consuming the mobile phone's battery power, when the mobile phone starts using power from a power source external to the mobile phone (say a car's electric socket), etc.

The change in the power mode of the mobile phone occurs when a car alarm goes off, when a house alarms goes off, when a safety door is opened, etc., as described in further detail hereinbelow.

For example, when a car burglar breaks into a car, the burglar may disconnect the car's battery. When the mobile phone installed with the apparatus is connected to the car's cigarette lighter 12 Volt socket, the mobile phone stops charging from the car's battery and starts consuming the mobile phone's own battery power. The apparatus detects the mobile phone's stopping the charging from the car's battery, and notifies the car's owner, say by a sending a predefined SMS (Short Messages Service) message, using one or more phone numbers defined in advance by the car's owner, as described in further detail hereinbelow.

The principles and operation of an apparatus, kit, computer readable media and method, according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
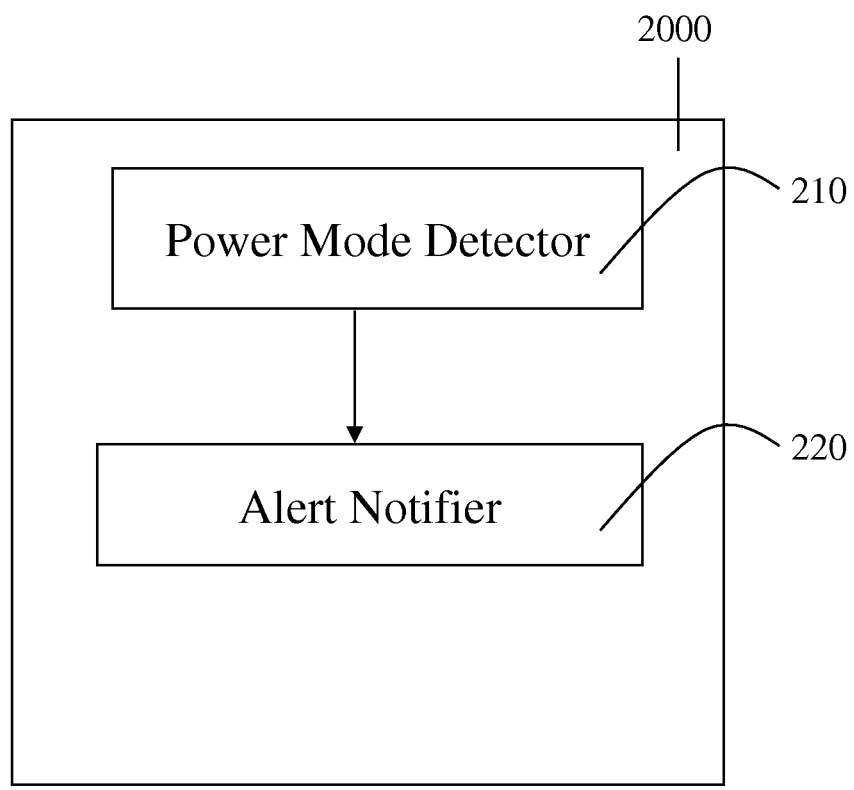
FIG. 2 is a block diagram schematically illustrating a first apparatus for alert notification, according to an exemplary embodiment of the present invention.

Reference is now made to FIG. 2, which is a block diagram schematically illustrating a first apparatus for alert notification, according to an exemplary embodiment of the present invention.

Apparatus 2000 for alert notification includes a power mode detector 210.

The power mode detector 210 detects a predefined change in a power mode of a mobile phone, say when the mobile phone starts charging, when the mobile phone stops charging, when the mobile phone starts consuming the mobile phone's own battery power, when the mobile phone starts using power from a power source external to the mobile phone (say using a car's electric socket), etc.

The mobile phone may be a smart phone, a cordless phone, a third (or higher) generation cellular phone, a computer equipped with a cellular modem, etc., as known in the art.

Optionally, the power mode detector 210 is implemented as a computer module (without physically changing the mobile phone), as an electric circuit installed on the mobile phone, or as a combination of a computer module and an electric circuit, say on a cellular phone of a car's owner.

Optionally, the power mode detector 210 is implemented as a computer module, as an electric circuit connected to the mobile phone, or both the computer module and the electric circuit, installed on a device wired to the mobile phone or on a device wirelessly connected to the cellular phone.

Apparatus 2000 further includes an alert notifier 220, in communication with the power mode detector 210.

Upon the detection of the predefined change in the power mode of the mobile phone, the alert notifier 220 notifies a predefined user, say the car's owner, about an alert condition the detected predefined change in the power mode is indicative of, say on a burglar who attempts to break into the car.

Optionally, the alert notifier 220 notifies the predefined user about the alert condition, using one or more of the following: a phone call, a video phone call, an SMS (Short Messages Service) message, an e-mail message, GPS (Global Positioning System) data, a message comprising a picture taken by the mobile phone, a message comprising a video clip taken by the mobile phone, a message comprising an audio message or a voice of a burglar, recorded by the mobile phone, etc., or any combination thereof.

Optionally, the alert notifier 220 is implemented as a computer module (without physically changing the mobile phone), as an electric circuit installed on the mobile phone, or as a combination of the computer module and the electric circuit, installed on a cellular phone of a car's owner.

Optionally, the alert notifier 220 is implemented as a computer module, as an electric circuit connected to the mobile phone, or both the computer module and the electric circuit, say on a device wired to the mobile phone or on a device wirelessly connected to the cellular phone.

Optionally, apparatus 2000 also includes an electric circuit which causes the predefined change in the power mode, as described in further detail hereinbelow. For example, the electric circuit may be connected to a car's ignition switch, thus allowing a user to control the power mode of the mobile phone, by turning the car's key inside the ignition switch, into a predefined position, as known in the art.

Optionally, apparatus 2000 also includes a mechanical device which causes the predefined change in the power mode. For example, the mechanical device may include a pulley system which causes the predefined change in the power mode when a safety door is opened, say by physically disconnecting the cellular phone from a charger, physically pulling a cellular phone charger's plug out of an electric socket, etc., as described in further detail hereinbelow.

Optionally, apparatus 2000 further includes a car alarm system or a home alarm system, which causes the predefined change in the power mode, as described in further detail hereinbelow.

Optionally, apparatus 2000 further includes a user interface operable by a user, say a user interface implemented on the mobile phone, a user interface implemented on a remote unit (say a remote control device), as known in the art. Using the user interface the user may customize the power mode detector 210, the alert notifier 220, or both, as described in further detail hereinbelow. Preferably, the user interface may also be operated by a user remote from the apparatus 2000, say using SMS (Short Messages Service) messages sent by the remote user and received by the mobile phone.

Optionally, using the user interface, the user may define one or more phone numbers (say by selecting one or more of phone numbers stored on the mobile phone's memory), to be used by the alert notifier 220, for notifying about the alert condition.

Optionally, using the user interface, the user may define one or more e-mail addresses (say by selecting one or more of e-mail addresses stored on the mobile phone's memory), to be used by the alert notifier 220, for notifying about the alert condition.

Optionally, using the user interface, the user may define a priority order between the selected phone numbers, and the alert notifier 220 uses the phone numbers, according to the user defined priority order (say by calling a second number only after a first number is busy).

Optionally, using the user interface, the user may define a password, and access to the user interface is restricted using the defined password, as known in the art.

Optionally, the user interface allows a remote user to define the password, phone numbers, e-mail addresses, priority order, etc., by sending an SMS or e-mail message to the mobile phone. Optionally, the SMS or e-message includes a command word used by the remote user, to turn apparatus 2000 (or a part thereof) on or off.

Optionally, using the user interface, the user may instruct the alert notifier 220 to play a sound file or a video file to an intruder, in parallel to notifying about the attempted intrusion, or shortly thereafter.

Optionally, using the user interface, the user may instruct the mobile phone to start a recording of a sound file or a video file, say after the user is notified about the alert condition, say by the alert notifier 220, as described in further detail hereinabove.

Optionally, using the user interface, the user may define a turn-on delay period (say of five minutes). The power mode detector 210 ignores changes in the power mode of the mobile phone, which occur within the turn-on delay period, thus allowing the user to turn the apparatus 2000.

Optionally, the alert notifier 220 delays the notification about the alert condition, say for two minutes, and the user is allowed to cancel the notification within the two minutes, say using the user interface, as described in further detail hereinabove.

Optionally, using the user interface, the user may define new functions to be performed by the apparatus 2000 or mobile phone. For example, the user interface may include a script language (say a macro language) module, usable by the user for defining the new functions, as known in the art.

Optionally, using the interface, the user may download and install updates or patches, say from a web site, on the apparatus 2000.

Optionally, using the user interface, the user may schedule one more functions to execute, say on a periodic basis, as known in the art.

Figure 3:
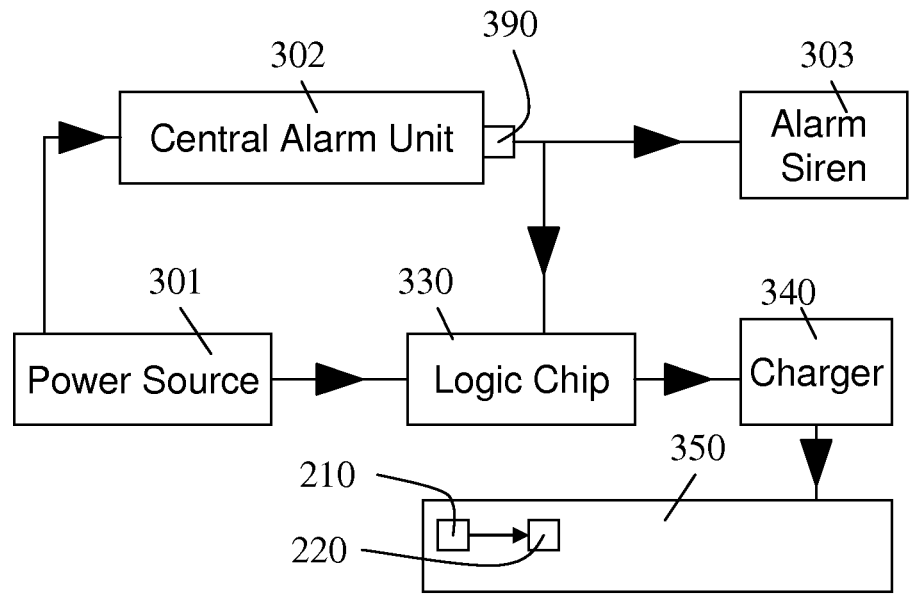
FIG. 3 is a block diagram schematically illustrating a second apparatus for alert notification, according to an exemplary embodiment of the present invention.

Reference is now made to FIG. 3, which is a block diagram schematically illustrating a second apparatus for alert notification, according to an exemplary embodiment of the present invention.

The second apparatus includes a power source 301 (say a battery of a car). The second apparatus further includes a central alarm unit 302, say a conventional alarm system's central alarm unit utilizing motion sensors, as described in further detail and illustrated using FIG. 1 hereinabove. The central alarm unit 302 is electrically powered by the power source 301.

The second apparatus further includes an alarm siren 303, say a buzzer or a speaker, as known in the art. The alarm siren 303 is electrically connected to the central alarm unit 302.

The second apparatus further includes the power mode detector 210 and alert notifier 220 of apparatus 2000, installed on a mobile phone 350, as described in further detail hereinabove.

The second apparatus further includes a charger 340, connected to the mobile phone 350, and a logic chip 330, as known in the art.

The charger 340 may be, but is not limited to: a hands free kit charger, a cellular phone charger connected to a main power supply, a mobile phone charger provided in a kit, a car charger connected to the car's cigarette lighter, etc., as known in the art.

The logic chip 330 is electrically connected to the power source 301, central alarm unit 302, and charger 340.

The central alarm unit 302 is connected to both the alarm siren 303 and the logic chip 330, using a single socket 390.

Optionally, the logic chip 330 is an integrated electric circuit which performs logic functions, for controlling the power supply to the charger 340.

In one example, the integrated electric circuit of the logic chip 330 operates as an AND gate, as known in the art. Consequently, electric power is supplied to the charger 340, through the logic chip 330 only if both the power source 301 and central alarm unit 302 provide electric power to the logic chip 330. That is to say that as long as the alarm siren 303 does not go off, the logic chip 330 does not supply electric power to the charger 340, and the mobile phone 350 consumes the power of the mobile phone's own battery.

When the central alarm unit 302 detects an intrusion attempt (say using the motion sensors, as described in further detail hereinabove), the central alarm unit 302 supplies electric power to both the alarm siren 303 and the logic chip 330, through the same socket 390. Consequently, the alarm siren 303 goes off.

Simultaneously, as both the power source 301 and central alarm unit 302 provide electric power to the logic chip 330, the logic chip 330 supplies electric power to the charger 340. Consequently, the mobile phone 350 starts charging from the charger 340.

As the mobile phone 350 starts to charge, the change in the mobile phone's power mode (i.e. from consuming the power of the battery of the mobile phone, to charging) is detected by the power mode detector 210. Upon the detection of the change in the mobile phone's 350 power mode, the alert notifier 220 notifies a remote user (say a car owner) about the attempted intrusion, as described in further detail hereinabove.

In another example, the integrated electric circuit of the logic chip 330 operates as a NAND gate, as known in the art. Consequently, electric power is supplied to the charger 340, as long as either the power source 301 or the central alarm unit 302 blocks electric power to the logic chip 330. That is to say that as long as the alarm siren 303 does not go off, the logic chip 330 supplies electric power to the charger 340 and the mobile phone 350 keeps charging.

When the central alarm unit 302 detects an intrusion attempt (say using the motion sensors), the central alarm unit 302 supplies electric power to both the alarm siren 303 and the logic chip 330, through the same socket 390. Consequently, the alarm siren 303 goes off.

Simultaneously, as both the power source 301 and central alarm unit 302 provide electric power to the logic chip 330, the logic chip 330 stops supplying electric power to the charger 340. Consequently, the mobile phone 350 stops charging and starts to consume the mobile phone's 350 own battery.

As the mobile phone 350 starts to use the mobile phone's 350 own battery, the change in the mobile phone's power mode (i.e. from charging to consuming the power of the battery of the mobile phone) is detected by the power mode detector 210. Upon the detection of the change in the mobile phone's 350 power mode, the alert notifier 220 notifies a remote user (say a car owner) about the attempted intrusion, as described in further detail hereinabove.

Optionally, the logic chip 330 is configurable by a user (say a remote user, utilizing SMS messages) for determining if electric power is to be provided to the charger 340 when no intrusion is detected and to be stopped when an intrusion is detected, or vise versa. Optionally, the user is allowed to configure the logic chip 330, using a user interface, as known in the art and described in further detail hereinabove, or using a switch mounted on the logic chip 330, as known in the art.

Figure 4:
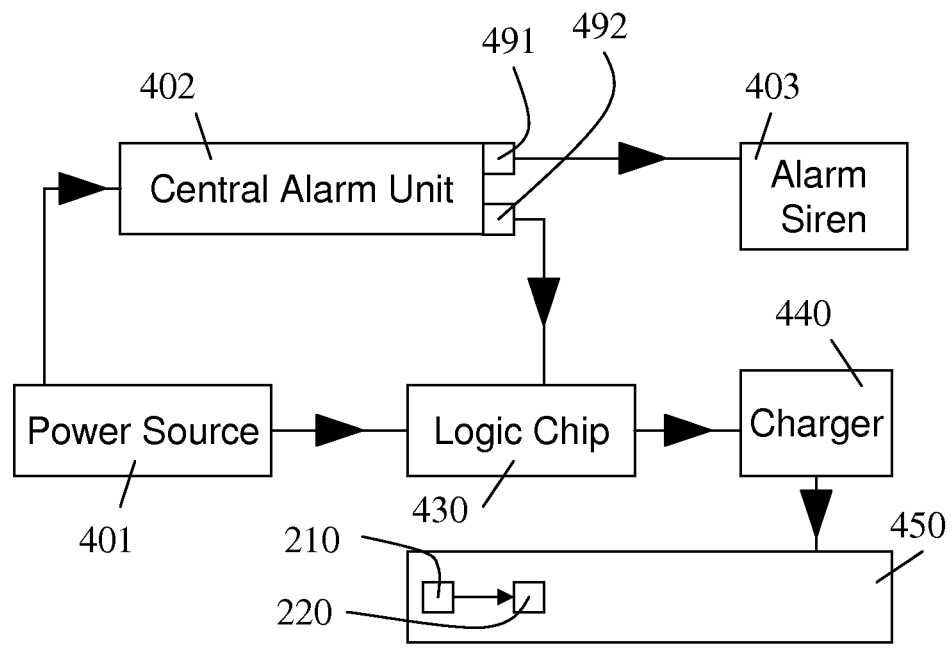
FIG. 4 is a block diagram schematically illustrating a third apparatus for alert notification, according to an exemplary embodiment of the present invention.

Reference is now made to FIG. 4, which is a block diagram schematically illustrating a third apparatus for alert notification, according to an exemplary embodiment of the present invention.

The third apparatus includes a power source 401 (say a battery of a car). The third apparatus further includes a central alarm unit 402, say a conventional alarm system's central alarm unit utilizing motion sensors, as described in further detail and illustrated using FIG. 1 hereinabove. The central alarm unit 402 is electrically powered by the power source 401.

The third apparatus further includes an alarm siren 403, say a buzzer or a speaker, as known in the art. The alarm siren 403 is electrically connected to the central alarm unit 402.

The third apparatus further includes the power mode detector 210 and alert notifier 220 of apparatus 2000, installed on a mobile phone 450, as described in further detail hereinabove.

The third apparatus further includes a charger 440, connected to the mobile phone 450, and a logic chip 430, as known in the art.

The charger 440 may be, but is not limited to: a hands free kit charger, a cellular phone charger connected to a main power supply, a mobile phone charger provide in a kit, a car charger connected to the car's cigarette lighter, etc., as known in the art.

The logic chip 430 is electrically connected to the power source 401, central alarm unit 402, and charger 440.

The central alarm unit 402 is connected to the alarm siren 403, using a first socket 491. The central alarm unit 402 is connected to the logic chip 430, using a second socket 492. By using separate sockets 491, 492, the central alarm unit 402 may use different logic for the alarm siren 403 and the logic chip 430, as known in the art. That is to say that the central alarm unit 402 may control the supply of electric power to the alarm siren 403, separately from the supply of electric power to the logic chip 430.

Optionally, the logic chip 430 is an integrated electric circuit which performs logic functions, for controlling the power source to the charger 440.

In one example, the integrated electric circuit of the logic chip 430 operates as an AND gate, as known in the art.

Consequently, electric power is supplied to the charger 440, through the logic chip 430 only if both the power source 401 and central alarm unit 402 provide electric power to the logic chip 430. As long as the central alarm unit 402 does not supply electric power to the logic chip 450, the logic chip 430 does not supply electric power to the charger 440, and the mobile phone 450 consumes the power of the mobile phone's own battery.

When the central alarm unit 402 detects an intrusion attempt (say using the motion sensors), the central alarm unit 402 supplies electric power to the alarm siren 403 and the alarm siren 403 goes off. Optionally, the central alarm unit 402 further supplies electric power to the logic chip 430. As both the power source 401 and central alarm unit 402 provide electric power to the logic chip 430, the logic chip 430 supplies electric power to the charger 440. Consequently, the mobile phone 450 starts charging from the charger 440.

As the mobile phone 450 starts to charge, the change in the mobile phone's power mode (i.e. from consuming the power of the battery of the mobile phone, to charging) is detected by the power mode detector 210. Upon the detection of the change in the mobile phone's 450 power mode, the alert notifier 220 notifies a remote user (say a car owner) about the attempted intrusion, as described in further detail hereinabove.

In another example, the integrated electric circuit of the logic chip 430 operates as a NAND gate, as known in the art. Consequently, electric power is supplied to the charger 440, as long as either the power source 401 or the central alarm unit 402 blocks electric power to the logic chip 430. As long as the logic chip 430 supplies electric power to the charger 440, the mobile phone 450 keeps charging.

When the central alarm unit 402 detects an intrusion attempt (say using the motion sensors), the central alarm unit 402 supplies electric power to the alarm siren 403 and the alarm siren 403 goes off. Optionally, the central alarm unit 402 further supplies electric power to the logic chip 430. As both the power source 401 and central alarm unit 402 provide electric power to the logic chip 430, the logic chip 430 stops supplying electric power to the charger 440. Consequently, the mobile phone 450 stops charging and starts to consume the mobile phone's 450 own battery.

As the mobile phone 450 starts to use the mobile phone's 450 own battery, the change in the mobile phone's 450 power mode (i.e. from charging to consuming the power of the battery of the mobile phone) is detected by the power mode detector 210. Upon the detection of the change in the mobile phone's 450 power mode, the alert notifier 220 notifies a remote user (say a car owner) about the attempted intrusion, as described in further detail hereinabove.

Optionally, either the logic chip 430 or the central alarm unit 402 is configurable by a user (say a remote user, utilizing SMS messages) for determining if electric power is to be provided to the charger 440 when no intrusion is detected and to be stopped when an intrusion is detected, or vise versa.

Figure 5:
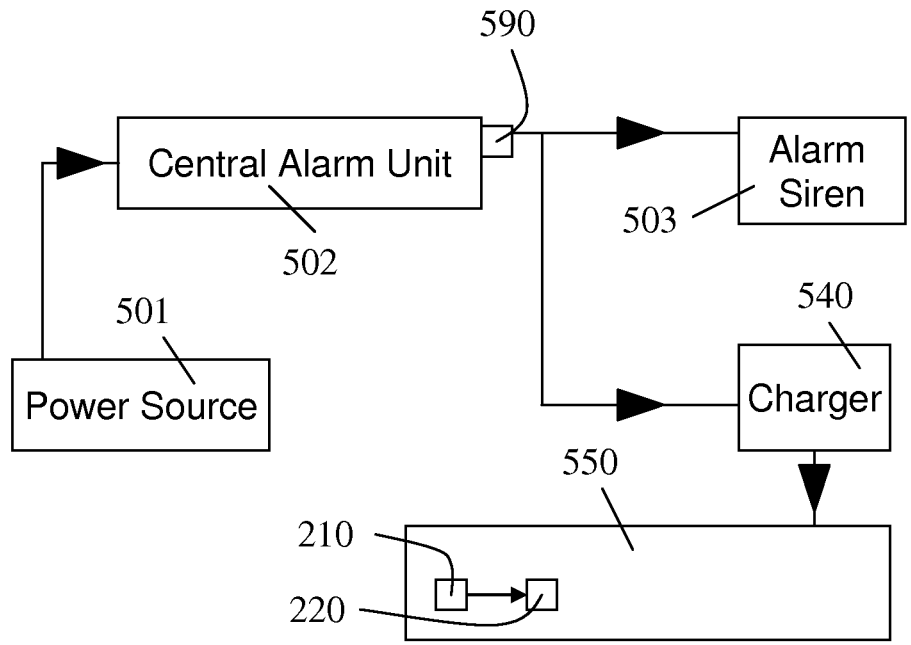
FIG. 5 is a block diagram schematically illustrating a fourth apparatus for alert notification, according to an exemplary embodiment of the present invention.

Reference is now made to FIG. 5, which is a block diagram schematically illustrating a fourth apparatus for alert notification, according to an exemplary embodiment of the present invention.

The fourth apparatus includes a power source 501 (say a battery of a car). The fourth apparatus further includes a central alarm unit 502, say a conventional alarm system's central alarm unit utilizing motion sensors, as described in further detail and illustrated using FIG. 1 hereinabove. The central alarm unit 502 is electrically powered by the power source 501.

The fourth apparatus further includes an alarm siren 503, such as a buzzer or a speaker, as known in the art. The alarm siren 503 is electrically connected to the central alarm unit 502.

The fourth apparatus further includes the power mode detector 210 and alert notifier 220 of apparatus 2000, installed on a mobile phone 550, as described in further detail hereinabove.

The fourth apparatus further includes a charger 540, connected to the mobile phone 550, as known in the art.

The charger 540 may be, but is not limited to: a hands free kit charger, a cellular phone charger connected to a main power supply, a mobile phone charger provide in a kit, a car charger connected to the car's cigarette lighter, etc., as known in the art.

The central alarm unit 502 is connected to both the alarm siren 503 and the charger 540, using a single socket 590.

When the central alarm unit 502 detects an intrusion attempt (say using motion sensors, as described in further detail hereinabove), the central alarm unit 502 supplies electric power to both the alarm siren 503 and the charger 540, through the socket 590. Consequently, the alarm siren 503 goes off and the mobile phone 550 starts charging from the charger 540.

As the mobile phone 550 starts to charge, the change in the mobile phone's power mode (i.e. from consuming the power of the battery of the mobile phone, to charging) is detected by the power mode detector 210. Upon the detection of the change in the mobile phone's 550 power mode, the alert notifier 220 notifies a remote user (say a car owner) about the attempted intrusion, as described in further detail hereinabove.

Figure 6:
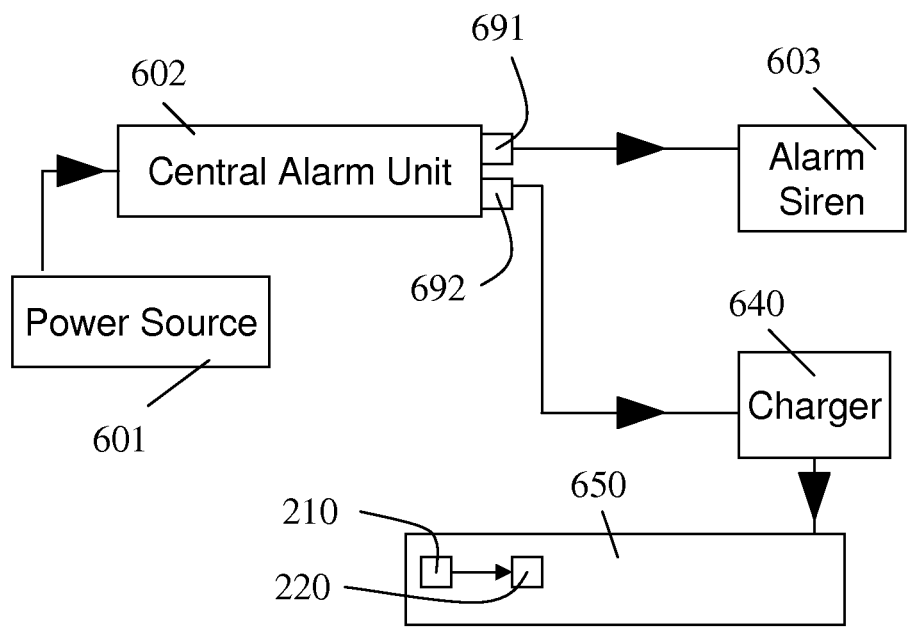
FIG. 6 is a block diagram schematically illustrating a fifth apparatus for alert notification, according to an exemplary embodiment of the present invention.

Reference is now made to FIG. 6, which is a block diagram schematically illustrating a fifth apparatus for alert notification, according to an exemplary embodiment of the present invention.

The fifth apparatus includes a power source 601 (say a battery of a car). The fifth apparatus further includes a central alarm unit 602, say a conventional alarm system's central alarm unit utilizing motion sensors, as described in further detail and illustrated using FIG. 1 hereinabove. The central alarm unit 602 is electrically powered by the power source 601.

The fifth apparatus further includes an alarm siren 603, such as a buzzer or a speaker, as known in the art. The alarm siren 603 is electrically connected to the central alarm unit 602.

The fifth apparatus further includes the power mode detector 210 and alert notifier 220 of apparatus 2000, installed on a mobile phone 650, as described in further detail hereinabove.

The fifth apparatus further includes a charger 640, connected to the mobile phone 650, as known in the art.

The charger 640 may be, but is not limited to: a hands free kit charger, a cellular phone charger connected to a main power supply, a mobile phone charger provide in a kit, a car charger connected to the car's cigarette lighter, etc., as known in the art.

The central alarm unit 602 is connected to the alarm siren 603 and the charger 640, using separate sockets 691 and 692, respectively.

When the central alarm unit 602 detects an intrusion attempt, say using the motion sensors, the central alarm unit 602 supplies electric power to the alarm siren 603, using socket 691. Consequently, the alarm siren 603 goes off.

Optionally the charger is supplied with electric power only upon an intrusion alert, using socket 692, and thus uses the mobile phone's 650 own battery until such an intrusion attempt occurs. Upon the detection of the intrusion attempt, the central alarm unit 602 starts supplying electric power to the charger 640.

As the mobile phone 650 starts to charge, the change in the mobile phone's power mode (i.e. from consuming the power of the battery of the mobile phone, to charging) is detected by the power mode detector 210. Upon the detection of the change in the mobile phone's 650 power mode, the alert notifier 220 notifies a remote user (say a car owner) about the attempted intrusion, as described in further detail hereinabove.

Optionally the charger is supplied with electric power as long as an intrusion alert has not occurred. The mobile phone 650 remains in a charging mode, until such an intrusion attempt occurs. Upon the detection of the intrusion attempt, the central alarm unit 602 stops supplying electric power to the charger 640.

As the mobile phone 650 stops charging, the change in the mobile phone's power mode (i.e. from charging to consuming the power of the battery of the mobile phone) is detected by the power mode detector 210. Upon the detection of the change in the mobile phone's 650 power mode, the alert notifier 220 notifies a remote user (say a car owner) about the attempted intrusion, as described in further detail hereinabove.

Figure 7:
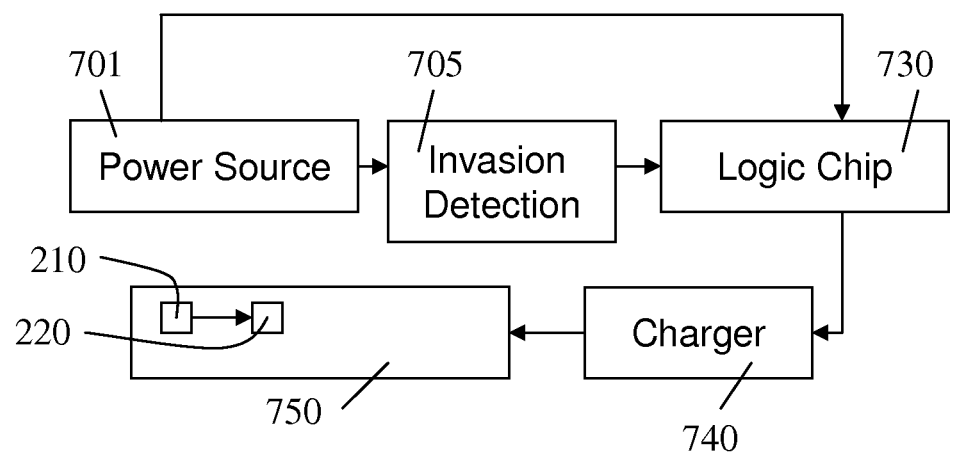
FIG. 7 is a block diagram schematically illustrating a sixth apparatus for alert notification, according to an exemplary embodiment of the present invention.

Reference is now made to FIG. 7, which is a block diagram schematically illustrating a sixth apparatus for alert notification, according to an exemplary embodiment of the present invention.

The sixth apparatus includes a power source 701 (say a battery of a car). The sixth apparatus further includes a conventional invasion detection system 705, as known in the art. The invasion detection system 705 is electrically powered by the power source 701.

The sixth apparatus further includes the power mode detector 210 and alert notifier 220 of apparatus 2000, installed on a mobile phone 750, as described in further detail hereinabove.

The sixth apparatus further includes a charger 740, connected to the mobile phone 750, and a logic chip 730, as described in further detail hereinabove.

The charger 740 may be, but is not limited to: a hands free kit charger, a cellular phone charger connected to a main power supply, a mobile phone charger provide in a kit, a car charger connected to the car's cigarette lighter, etc., as known in the art.

The logic chip 730 is electrically connected to the power source 701, invasion detection system 705, and charger 740.

Optionally, the logic chip 730 is an integrated electric circuit which performs logic functions, for controlling the power supply to the charger 740.

In one example, the integrated electric circuit of the logic chip 730 operates as an AND gate, as known in the art. Consequently, electric power is supplied to the charger 740 through the logic chip 730, only if both the power source 701 and invasion detection system 705 provide electric power to the logic chip 730. That is to say that as long as no attempted intrusion is detected by the invasion detection system 705, the logic chip 730 does not supply electric power to the charger 740, and the mobile phone 750 consumes the power of the mobile phone's own battery.

When the invasion detection system 705 detects an intrusion attempt (say using motion sensors, as described in further detail hereinabove and illustrated using FIG. 1), the invasion detection system 705 starts supplying electric power to the logic chip 730.

As both the power source 701 and invasion detection system 705 provide electric power to the logic chip 730, the logic chip 730 supplies electric power to the charger 740. Consequently, the mobile phone 750 starts charging from the charger 740.

As the mobile phone 750 starts to charge, the change in the mobile phone's power mode (i.e. from consuming the power of the battery of the mobile phone, to charging) is detected by the power mode detector 210. Upon the detection of the change in the mobile phone's 750 power mode, the alert notifier 220 notifies a remote user (say a car owner) about the attempted intrusion, as described in further detail hereinabove.

In another example, the integrated electric circuit of the logic chip 730 operates as a NAND gate, as known in the art. Consequently, as long as either the power source 701 or the invasion detection system 705 blocks electric power to the logic chip 730, electric power is supplied to the charger 730. That is to say that as long as no intrusion attempt is detected by the invasion detection system 705, the logic chip 730 supplies electric power to the charger 740 and the mobile phone 750 keeps charging.

When the invasion detection system 705 detects an intrusion attempt, the invasion detection system 705 starts supplying electric power to the logic chip 730.

As both the power source 701 and invasion detection system 705 provide electric power to the logic chip 730, the logic chip 770 stops supplying electric power to the charger 740. Consequently, the mobile phone 750 stops charging and starts to consume the mobile phone's 750 own battery.

As the mobile phone 750 starts to use the mobile phone's 750 own battery, the change in the mobile phone's power mode (i.e. from charging to consuming the power of the battery of the mobile phone) is detected by the power mode detector 210. Upon the detection of the change in the mobile phone's 750 power mode, the alert notifier 220 notifies a remote user (say a car owner) about the attempted intrusion, as described in further detail hereinabove.

Optionally, either the logic chip 730 or the invasion detection system 705 is configurable by a user (say a remote user, utilizing SMS messages) for determining if electric power is to be provided to the charger 740 when no intrusion is detected and to be stopped when an intrusion is detected, or vise versa, say using a user interface, as described in further detail hereinabove.

Figure 8:
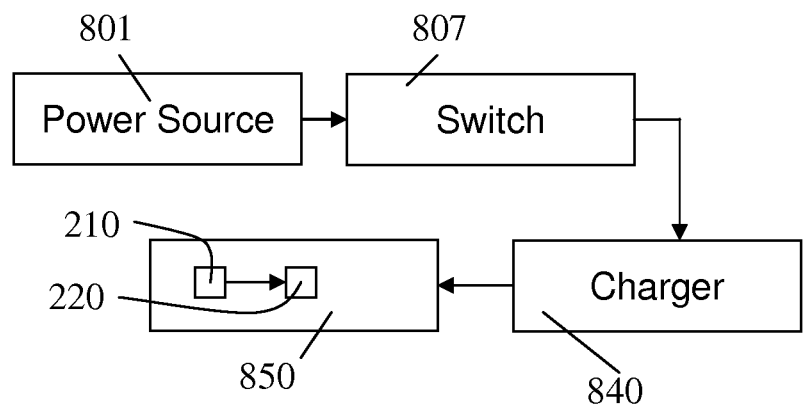
FIG. 8 is a block diagram schematically illustrating a seventh apparatus for alert notification, according to an exemplary embodiment of the present invention.

Reference is now made to FIG. 8, which is a block diagram schematically illustrating a seventh apparatus for alert notification, according to an exemplary embodiment of the present invention.

The seventh apparatus includes a power source 801 (say a battery of a car).

The seventh apparatus further includes a switch 807, say a conventional electro-mechanical switch which has one or more sets of electric contacts. Each set of contacts can be in one of two states: a closed-state where the contacts touch and electricity can flow between the contacts, or an open-state where the contacts are separated and electricity cannot flow between the contacts.

The switch may include, but is not limited to: a light switch, an electro-mechanical switch (say an electro-mechanical switch on an extension cable), a mercury switch, a changeover switch, a car switch implemented as part of a car ignition switch, etc., as known in the art.

Optionally, the seventh apparatus further includes a mechanical device, say a pulley system, a trip wire, etc., as known in the art. Upon an alert condition, say an attempt to open a safety door, the mechanical device pushes the switch

807, thus causing the sets of contacts to switch from the closed-state to the open-state, or vise versa.

The seventh apparatus further includes the power mode detector 210 and alert notifier 220 of apparatus 2000, installed on a mobile phone 850, as described in further detail hereinabove.

The seventh apparatus further includes a charger 840, electrically connected to the mobile phone 850 and to the switch 807.

When the switch 807 is pushed, the power source 801 supplies electric power to the charger 840, through the switch 807. Consequently, the mobile phone 850 starts charging from the charger 840.

As the mobile phone 850 starts to charge, the change in the mobile phone's power mode (i.e. from consuming the power of the battery of the mobile phone, to charging) is detected by the power mode detector 210. Upon the detection of the change in the mobile phone's 850 power mode, the alert notifier 220 notifies a remote user (say a car owner) about the attempted intrusion, as described in further detail hereinabove.

Figure 9:
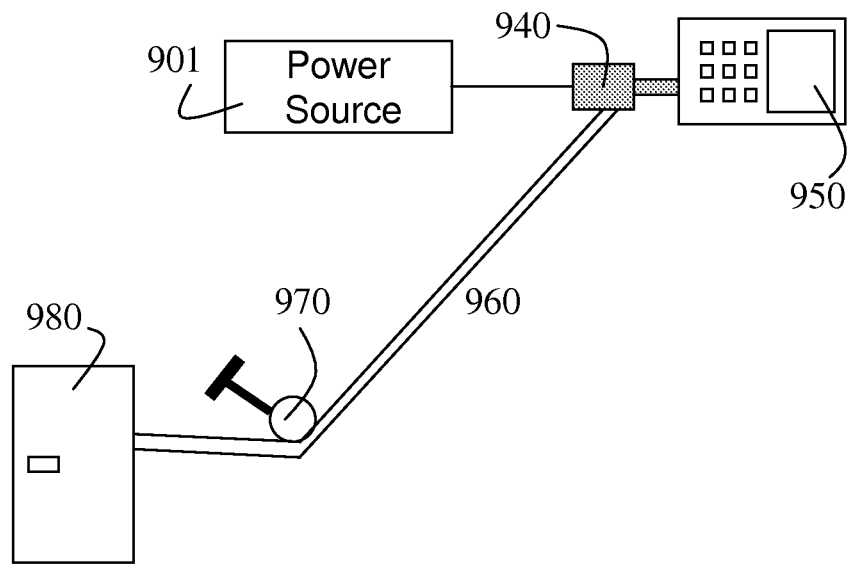
FIG. 9 is a block diagram schematically illustrating an eighth apparatus for alert notification, according to an exemplary embodiment of the present invention.

Reference is now made to FIG. 9, which is a block diagram schematically illustrating an eighth apparatus for alert notification, according to an exemplary embodiment of the present invention.

The eighth apparatus includes a power source 901, such as a car battery, a socket of an electric network, etc., as known in the art.

The eighth apparatus further includes charger 940, say a conventional mobile phone charger, as known in the art.

The charger 940 is connected and powered by the power source 901.

The eighth apparatus further includes the power mode detector 210 and alert notifier 220 of apparatus 2000, installed on a mobile phone 950, as described in further detail hereinabove. As long as the charger 940 is powered by the power source 901, the mobile phone 950 is a mode of charging from the charger 940, as known in the art.

The eighth apparatus further includes a pulley system, which typically includes one or more belts 960, one or more wheels 970, etc., as known in the art.

The belts 960 are physically connected to a door or a window 980. The belts 960 are further connected to the charger 940.

When an intruder opens the door or window 980, the belts pull the charger and physically disconnect the charger 940 from the power source 901, say by pulling the charger's 940 electric cable, thus pulling the charger's 940 plug out of the socket of the electric network.

Consequently, the mobile phone 950 stops charging and starts to consume the mobile phone's 950 own battery.

As the mobile phone 950 starts to use the mobile phone's 950 own battery, the change in the mobile phone's power mode (i.e. from charging to consuming the power of the battery of the mobile phone) is detected by the power mode detector 210. Upon the detection of the change in the mobile phone's 950 power mode, the alert notifier 220 notifies a remote user (say a car owner) about the attempted intrusion, as described in further detail hereinabove.

Figure 10:
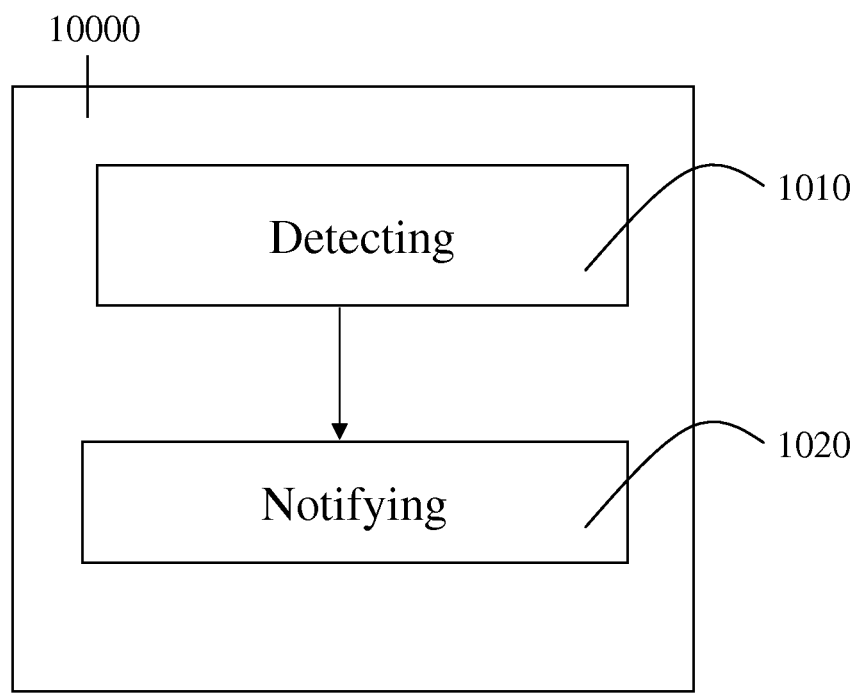
FIG. 10 is a block diagram schematically illustrating a computer readable medium storing computer executable instructions, according to an exemplary embodiment of the present invention.

Reference is now made to FIG. 10, which is a block diagram schematically illustrating a computer readable medium storing computer executable instructions, according to an exemplary embodiment of the present invention.

The computer readable medium 10000 say a CD-ROM, a USB Memory, a portable hard disk, etc., stores computer executable instructions for detecting 1010 a predefined change in a power mode of a mobile phone, as described in further detail hereinbelow.

For example, the instructions may detect that a mobile phone starts charging, that the mobile phone stops charging, that the mobile phone starts consuming the mobile phone's own battery power, that the mobile phone starts using power from a power source external to the mobile phone (say using a car's electric socket), etc.

The mobile phone may be a smart phone, a cordless phone, a third (or higher) generation cellular phone, a computer equipped with a cellular modem, etc., as known in the art.

The computer readable medium 10000 further stores computer executable instructions for notifying 1020 a predefined user (say the car's owner), about an alert condition the detected predefined change in the power mode is indicative of, say on a burglar who attempts to break into the car, on an unauthorized person attempting to open a safety door, etc., as described in further detail hereinbelow.

Optionally, the alert the predefined user is notified 1020 about the alert condition, using one or more of the following: a phone call, a video phone call, an SMS (Short Messages Service) message, an e-mail message, GPS (Global Positioning System) data, a message comprising a picture taken by the mobile phone, a message comprising a video clip taken by the mobile phone, a message comprising an audio message or a voice of a burglar, recorded by the mobile phone, etc., or any combination thereof.

Optionally, the computer readable medium 10000 further stores computer executable instructions for implementing a user interface, as described in further detailed hereinabove.

Figure 11:
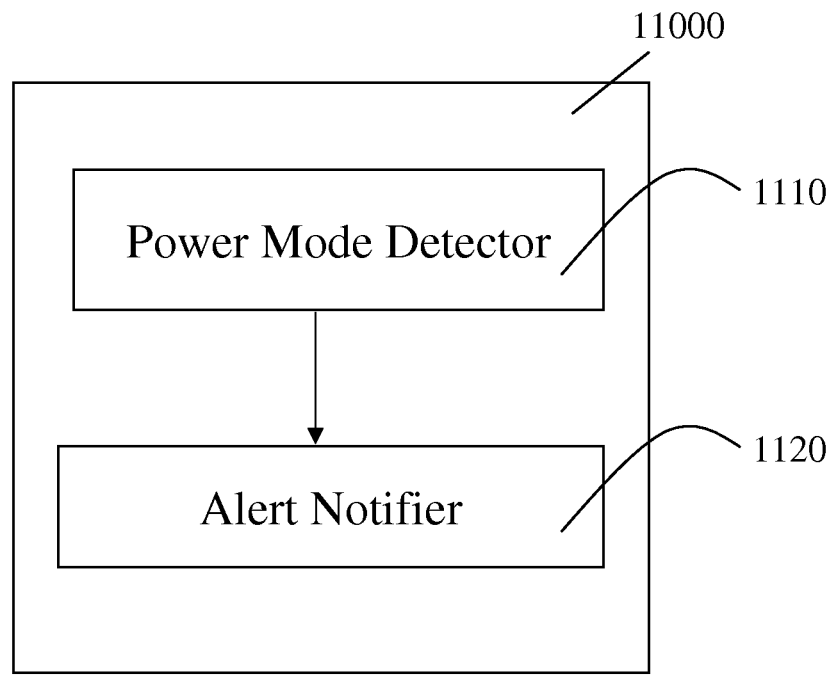
FIG. 11 is a block diagram schematically illustrating a kit for alert notification, according to an exemplary embodiment of the present invention.

Reference is now made to FIG. 11, which is a block diagram schematically illustrating a kit for alert notification, according to an exemplary embodiment of the present invention.

A kit 11000 for alert notification, according to an exemplary embodiment of the present invention, includes a power mode detector 1110.

The power mode detector 1110 detects a predefined change in a power mode of a mobile phone, say when the mobile phone starts charging, when the mobile phone stops charging, when the mobile phone starts consuming the mobile phone's own battery power, when the mobile phone starts using power from a power source external to the mobile phone (say using a car's electric socket), etc.

The mobile phone may be a smart phone, a cordless phone, a third (or higher) generation cellular phone, a computer equipped with a cellular modem, etc., as known in the art.

The kit 11000 further includes an alert notifier 1120, which communicates with the power mode detector 1110.

Upon the detection of the predefined change in the power mode of the mobile phone, the alert notifier 1120 notifies a predefined user, say the car's owner, about an alert condition the detected predefined change in the power mode is indicative of, say on a burglar who attempts to break into the car.

Optionally, the alert notifier 1120 notifies the predefined user about the alert condition, using one or more of the following: a phone call, a video phone call, an SMS (Short Messages Service) message, an e-mail message, GPS (Global Positioning System) data, a message comprising a picture taken by the mobile phone, a message comprising a video clip taken by the mobile phone, a message comprising an audio message recorded by the mobile phone, etc., or any combination thereof.

Optionally, the power mode detector 1110 and the alert notifier 1120 are implemented as computer executable instructions stored on a computer readable media, say on a CD-ROM, a USB Memory, a Portable Hard Disk, etc., as described in further detail hereinabove. The computer readable media may be provided as a part of the kit 11000.

Optionally, the power mode detector 1110 is implemented as a computer module, as an electric circuit connected to the mobile phone, or as a combination of a computer module and an electric circuit, installed on a device which may be connected to the mobile phone.

Optionally, the alert notifier 1120 is implemented as a computer module, as an electric circuit connected to the mobile phone, or as a combination of a computer module and an electric circuit, installed on a device which may be connected to the mobile phone.

Optionally, the kit 11000 further includes an electric circuit which causes the predefined change in the power mode, as described in further detail hereinbelow.

Optionally, the kit 11000 also includes a mechanical device which causes the predefined change in the power mode. For example, the mechanical device may include a pulley system which causes the predefined change in the power mode when a safety door is opened, say by physically disconnecting the cellular phone from a charger, as described in further detail hereinbelow.

Optionally, the kit 11000 further includes a car alarm system, a home alarm system, etc., which causes the predefined change in the power mode, as described in further detail hereinbelow. For example, the kit 11000 may include one or more sensors, switches, electric wires, electric circuits, which cause the power supplied to the mobile phone to start or stop, upon an intrusion attempt, thus bringing about the predefined change in the power mode of the mobile phone.

Optionally, the kit 11000, further includes a charger, connectable to the mobile phone, for charging the mobile phone, as described in further detail hereinabove.

The charger may be, but is not limited to: a hands free kit charger, a cellular phone charger connected to a main power supply, a car charger connectable to the car's cigarette lighter (say using a 12V car lighter plug), or any conventional mobile phone charger provide in as a part of the kit 11000, as known in the art.

Optionally, the kit 11000 further includes a user interface operable by a user, for customizing the power mode detector 1110, the alert notifier 1120, or both, as described in further detail hereinbelow.

Optionally, the user interface is implemented as computer executable instructions stored on a computer readable media (say a CD-ROM, a USB Memory, etc.), as described in further detail hereinabove.

Preferably, the user interface may also be operated by a user remote from the mobile phone, say using SMS (Short Messages Service) messages sent by the remote user and received by the mobile phone.

Optionally, the kit 11000 further includes a phone holder for the mobile phone, which may be mounted on a part of the car, a furniture, etc., as known in the art. Optionally, the lock holder includes a lock, thus preventing the mobile phone from being stolen, as known in the art.

Optionally, the kit 11000 further includes a container, for the mobile phone. The container is non-transparent, and exposes only the mobile phone's camera.

Optionally, the kit 11000 further includes one or microphones connectable to the mobile phone. The microphones may be used either as sensors, for detecting intrusion, or to record the burglars once an intrusion is detected, say by a conventional alarm system, as described in further detail hereinabove.

Optionally, the kit 11000 further includes one or cameras connectable to the mobile phone. The cameras may be used either as sensors, for detecting intrusion, or to capture images of the burglars once an intrusion is detected (say by a conventional alarm system), as described in further detail hereinabove.

Figure 12:
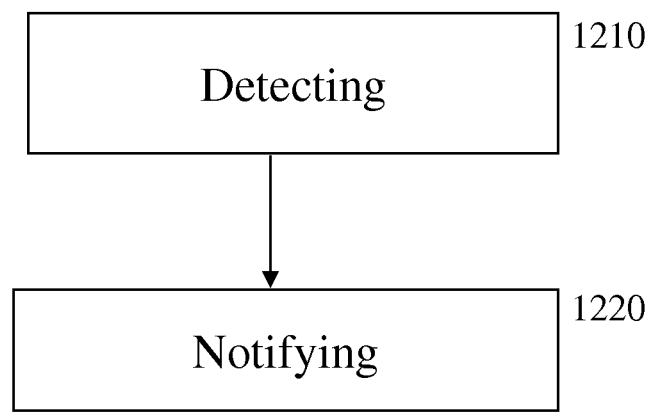
FIG. 12 is a flow chart illustrating a method for alert notification, according to an exemplary embodiment of the present invention.

Reference is now made to FIG. 12, which is a flow chart illustrating a method for alert notification, according to an exemplary embodiment of the present invention.

Optionally, the method of FIG. 12 is implemented using apparatus 2000, as described in further detail hereinabove.

In the method of FIG. 12, there is detected 1210 a predefined change in a power mode of a mobile phone, say when the mobile phone starts charging, when the mobile phone stops charging, when the mobile phone starts consuming the mobile phone's own battery power, when the mobile phone starts using power from a power source external to the mobile phone (say using a car's electric socket), etc.

The mobile phone may be a smart phone, a cordless phone, a third (or higher) generation cellular phone, a computer equipped with a cellular modem, etc., as known in the art.

Optionally, the predefined change is detected by a power mode detector 210, as described in further detail hereinabove.

Upon the detection 1210 of the predefined change in the power mode of the mobile phone, a predefined user (say the car's owner) is notified 1220 about an alert condition the detected predefined change in the power mode is indicative of, say about a burglar who attempts to break into the car.

Optionally, the predefined user is notified 1220 about the alert condition, using one or more of the following: a phone call, a video phone call, an SMS (Short Messages Service) message, an e-mail message, GPS (Global Positioning System) data, a message comprising a picture taken by the mobile phone, a message comprising a video clip taken by the mobile phone, a message comprising an audio message recorded by the mobile phone, etc., or any combination thereof.

Optionally, the predefined user is notified 1220 by the alert notifier 220, implemented as a computer module (without physically changing the mobile phone), as an electric circuit installed on the mobile phone, or as a combination of the computer module and the electric circuit, say on a cellular phone of a car's owner, as described in further detail hereinabove.

Optionally, the change in the power mode of the mobile phone is caused by an electric circuit, as described in further detail hereinbelow.

Optionally, the change in the power mode of the mobile phone is caused by a mechanical device. For example, the mechanical device may include a pulley system which causes the predefined change in the power mode when a safety door is opened, say by physically disconnecting the mobile phone from a charger, as described in further detail hereinbelow.

Optionally, the change in the power mode of the mobile phone is caused by a car alarm system or a home alarm system, as described in further detail hereinbelow.

Figure 13:
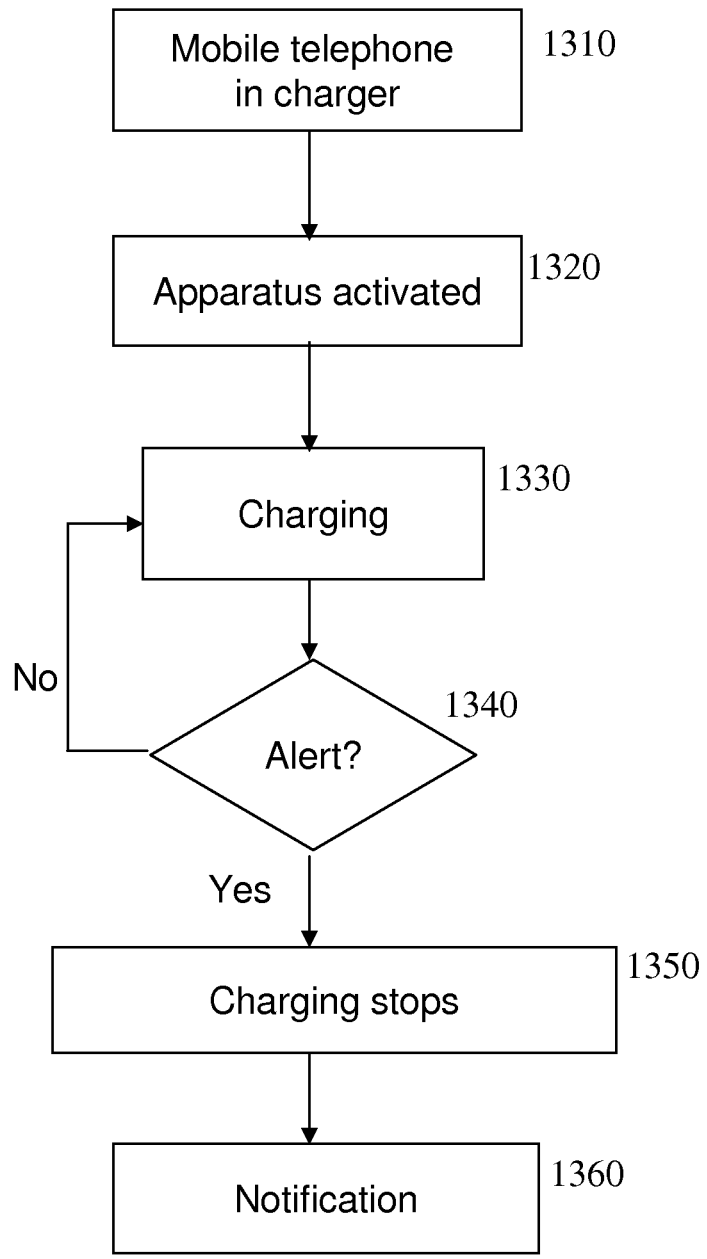
FIG. 13 is a flow chart illustrating a first scenario for alert notification, according to an exemplary embodiment of the present invention.

Reference is now made to FIG. 13, which is a flow chart illustrating a first scenario for alert notification, according to an exemplary embodiment of the present invention.

In a first scenario for alert notification, according to an exemplary embodiment of the present invention, a mobile phone is placed 1310 in a charger, say in a cellular phone charger connected to a car's cigarette lighter 12 Volt socket, as known in the art.

The power mode detector 210 and alert notifier 220 of apparatus 2000 (say computer modules installed on the mobile phone, as described in further detail hereinabove) are activated 1320, and the mobile phone starts charging 1330, say from the car's battery, as described in further detail hereinabove.

Next, there occurs an alert condition 1340, such as an attempt to break into a car, apartment, or office, an attempt to open a locked door or a window, an attempt to open a closet, an attempt to open a safety-deposit box, etc.

Consequently, the power source to the mobile phone stops (say by a central alarm unit, a logic chip, a switch pushed by a mechanical device such as a pulley system, etc.). The mobile phone stops charging 1350 and starts consuming the power of the mobile phone's own battery, as described in further detail hereinabove.

Upon the detection of the change in the mobile phone's power mode (i.e. from charging to using the battery of the mobile phone), a remote user such as an owner of a car is notified 1360 about the alert condition. The remote used is notified 1360 about the alert condition by the alert notifier 220, say using an SMS (Short Messages Service), a phone call, a video phone call, a message which includes a picture taken by the mobile phone's camera, an audio message recorded on the mobile phone, etc., as described in further detail hereinabove.

Figure 14:
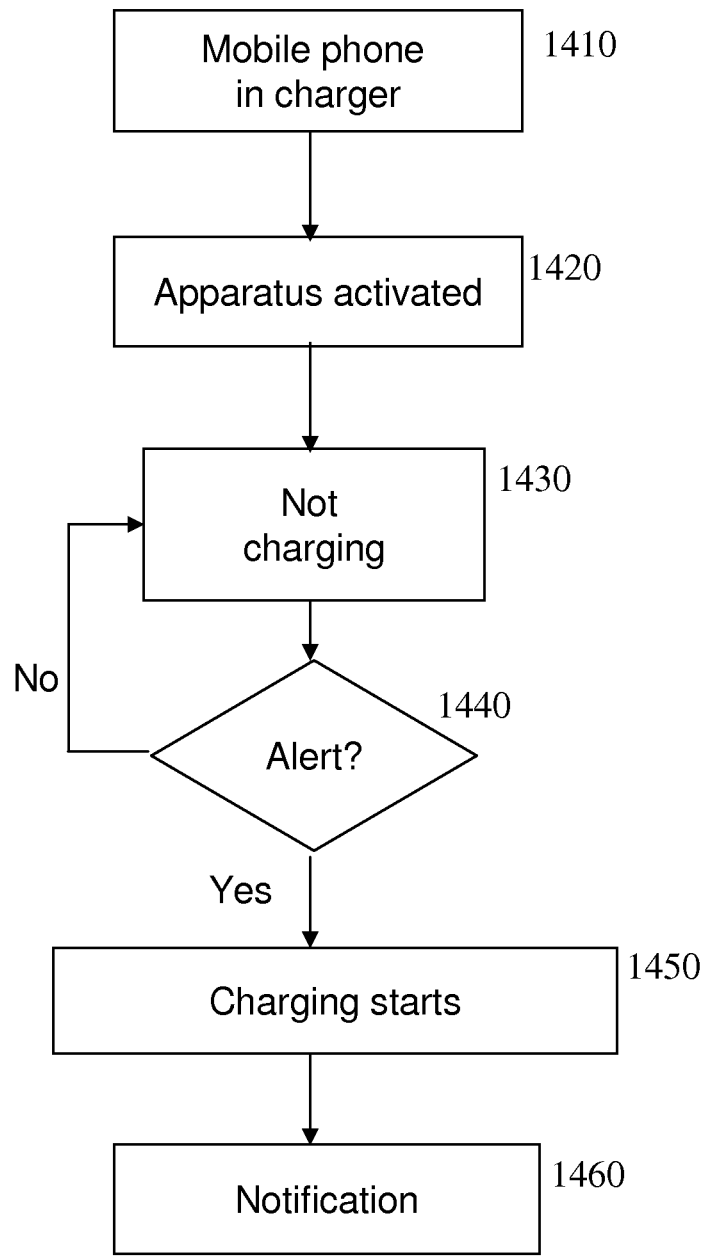
FIG. 14 is a flow chart illustrating a second scenario for alert notification, according to an exemplary embodiment of the present invention.

Reference is now made to FIG. 14, which is a flow chart illustrating a second scenario for alert notification, according to an exemplary embodiment of the present invention.

In a second scenario for alert notification, according to an exemplary embodiment of the present invention, a mobile phone is placed 1410 in a charger, say in a cellular phone charger connectable to an external power source, as known in the art.

The power mode detector 210 and alert notifier 220 of apparatus 2000 (say computer modules installed on the mobile phone, as described in further detail hereinabove) are activated 1420. However, initially, the charger is not electrically connected to the external power source, and the mobile phone consumes the power of a battery inside the mobile phone and does not charge 1430.

Next, there occurs an alert condition 1440, such as an attempt to break into a car, apartment, or office, an attempt to open a locked door or a window, an attempt to open a closet, an attempt to open a safety-deposit box, etc.

Consequently, the charger is electrically connected to the external power source (say by a central alarm unit, a logic chip, a switch pushed by a mechanical device such as a pulley system, etc.). The mobile phone starts charging 1450 and stops consuming the power of the mobile phone's own battery, as described in further detail hereinabove.

Upon the detection of the change in the mobile phone's power mode (i.e. from using the battery of the mobile phone to charging), a remote user such as an owner of a car is notified 1460 about the alert condition. The remote used is notified 1460 about the alert condition by the alert notifier 220, say using an SMS (Short Messages Service), a phone call, a video phone call, a message which includes a picture taken by the mobile phone's camera, an audio message recorded on the mobile phone, etc., as described in further detail hereinabove.

It is expected that during the life of this patent many relevant devices and systems will be developed and the scope of the terms herein, particularly of the terms "Mobile Phone", "Alarm System", "Switch", "Charger", "SMS" "e-mail" and "Battery" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for alert notification, the apparatus comprising:
    a power mode detector, configured to detect a shift of a mobile phone between two power modes of the mobile phone, the detected shift being indicative of an alert condition; and
    an alert notifier, associated with said power mode detector and configured to notify a predefined user about the alert condition, wherein the power modes of the mobile phone comprise a mode of consuming a power source internal to the mobile phone and a mode of charging the power source internal to the mobile phone.

2. The apparatus of claim 1, wherein the predefined change in the power modes of the mobile phone differ in a power source being consumed by the mobile phone.

3. The apparatus of claim 1, wherein the shift further comprises stopping to consume a power source external to the mobile phone.

4. The apparatus of claim 1, wherein the shift further comprises stopping to consume a power source inside the mobile phone.

5. The apparatus of claim 1, wherein said alert notifier is further configured to notify the predefined user about the alert condition, using a phone call.

6. The apparatus of claim 1, wherein said alert notifier is further configured to notify the predefined user about the alert condition, using a video phone call.

7. The apparatus of claim 1, wherein said alert notifier is further configured to notify the predefined user about the alert condition, using an SMS (Short Messages Service) message.

8. The apparatus of claim 1, wherein said alert notifier is further configured to notify the predefined user about the alert condition, using an e-mail message.

9. The apparatus of claim 1, wherein said alert notifier is further configured to notify the predefined user about the alert condition, using a message comprising GPS (Global Positioning System) data.

10. The apparatus of claim 1, wherein said alert notifier is further configured to notify the predefined user about the alert condition, using a message comprising a picture taken by the mobile phone.

11. The apparatus of claim 1, further comprising an electric circuit configured to cause the shift.

12. The apparatus of claim 1, further comprising a mechanical device configured to cause the shift.

13. The apparatus of claim 1, further comprising a pulley system configured to cause the shift.

14. The apparatus of claim 1, further comprising a car alarm system configured to cause the shift.

15. The apparatus of claim 1, further comprising a home alarm system configured to cause the shift.

16. The apparatus of claim 1, further comprising a user interface operable by a user, for customizing at least one of said power mode detector and said alert notifier.

17. The apparatus of claim 1, further comprising a user interface operable by a user remote from the cellular phone, for customizing at least one of said power mode detector and said alert notifier.

18. A non-transitory computer readable medium storing computer executable instructions for performing the steps of:
   a) detecting a shift of a mobile phone between two power modes of the mobile phone, the detected shift being indicative of an alert condition; and
   b) notifying a predefined user about the alert condition, wherein the power modes of the mobile phone comprise a mode of consuming a power source internal to the mobile phone and a mode of charging the power source internal to the mobile phone.

19. Kit for alert notification, the kit comprising a non-transitory computer readable medium storing computer executable instructions for performing the steps of: detecting a shift of a mobile phone between two power modes of the mobile phone, the detected shift being indicative of an alert condition; and notifying a predefined user about the alert condition; and a device connectable to the mobile phone and configured to cause the shift, wherein the power modes of the mobile phone comprise a mode of consuming a power source internal to the mobile phone and a mode of charging the power source internal to the mobile phone.

20. Kit for alert notification, the kit comprising:
   a power mode detector, configured to detect a shift of a mobile phone between two power modes of the mobile phone, the detected shift being indicative of an alert condition; and
   an alert notifier, associated with said power mode detector and configured to notify a predefined user about the alert condition, wherein the power modes of the mobile phone comprise a mode of consuming a power source internal to the mobile phone and a mode of charging the power source internal to the mobile phone.

21. Method for alert notification, the method comprising the steps of:
   a) detecting a shift of a mobile phone between two power modes of the mobile phone, the detected shift being indicative of an alert condition; and
   b) notifying a predefined user about the alert condition, wherein the power modes of the mobile phone comprise a mode of consuming a power source internal to the mobile phone and a mode of charging the power source internal to the mobile phone.

* * * * *